Jan. 17, 1939.     H. H. BEVERAGE     2,144,215
ELECTRICAL ENERGY MEASURING CIRCUIT
Filed April 28, 1934     2 Sheets-Sheet 1
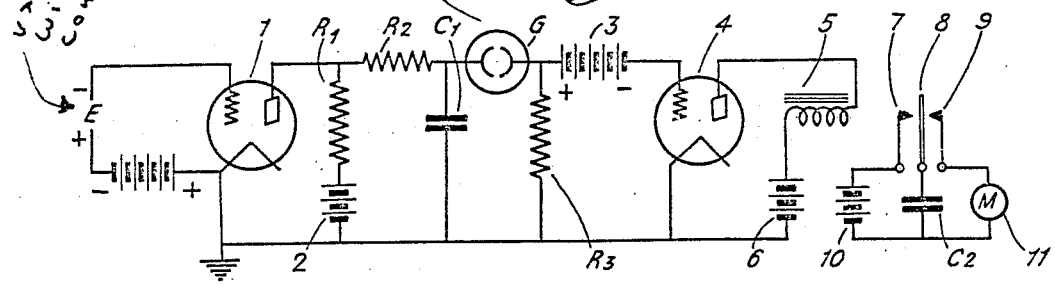
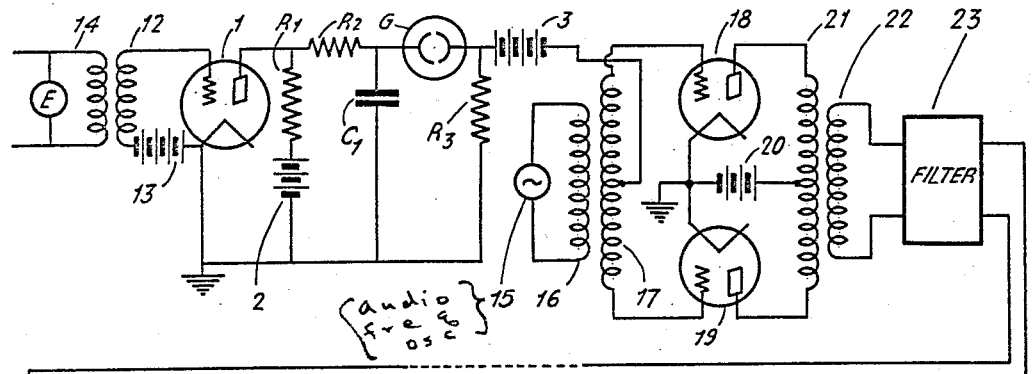
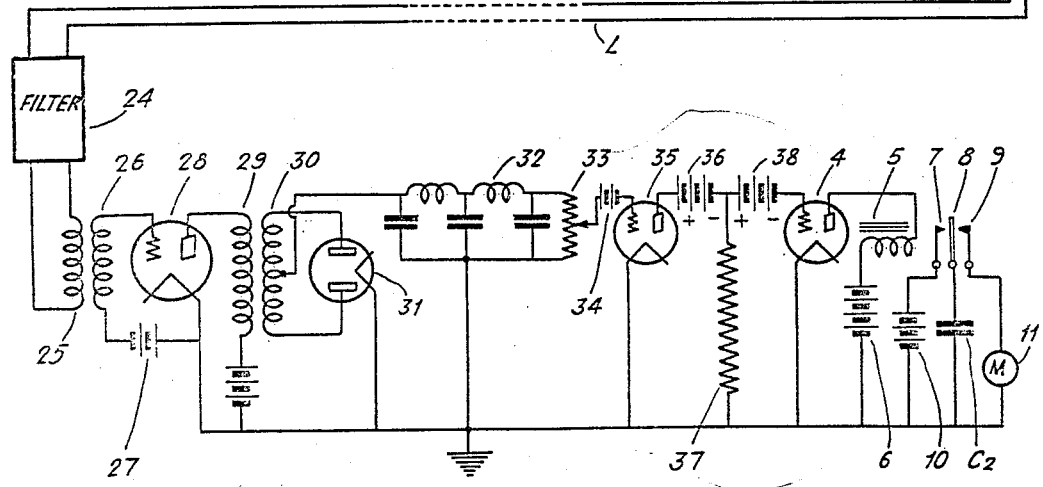
INVENTOR
H.H. BEVERAGE
BY
ATTORNEY Jan. 17, 1939.   H. H. BEVERAGE   2,144,215
ELECTRICAL ENERGY MEASURING CIRCUIT
Filed April 28, 1934   2 Sheets-Sheet 2
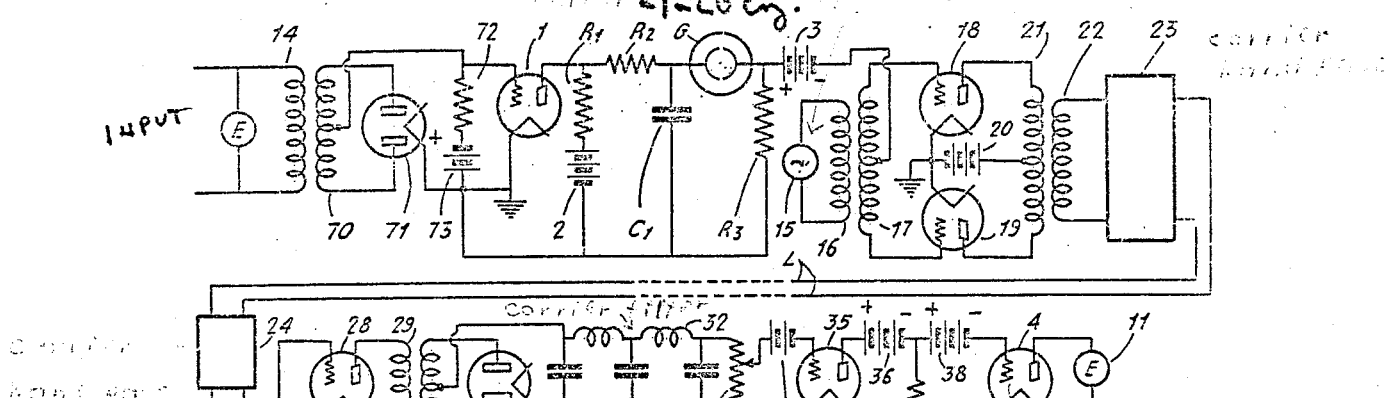

Patented Jan. 17, 1939

2,144,215

UNITED STATES PATENT OFFICE 2,144,215

ELECTRICAL ENERGY MEASURING CIRCUIT

Harold H. Beverage, Riverhead, N. Y., assignor to Radio Corporation of America, a corporation of Delaware Application April 28, 1934, Serial No. 722,888

4 Claims. (Cl. 177—351)

This invention relates to circuit arrangements for registering electrical energy, and in particular to telemetering circuits for registering voltage or current at a distance over a transmission medium.

In my United States Patent No. 2,014,518, granted September 17, 1935, there is described a remote control system for a plurality of relaying stations wherein the operational functions of a remote station are controlled by a distant master station and wherein local radio frequency oscillations at the relaying stations, whose intensity is characteristic of the modulation level of the apparatus thereat, are sent out over a wire transmission medium, such as a line, to the control point where they are utilized to operate a suitable indicating device in accordance with the intensity of the oscillations. The accuracy of such a method of telemetering, it has been found, is dependent upon the constancy of the various vacuum tubes employed in the system as well as on the characteristics of the transmission medium which may be either a radio channel or wire line.

The present invention is an alternative and more efficient telemetering circuit than that hereinabove outlined in that the accuracy of the registration circuit is independent, to a large extent, of the transmission characteristics of the line and any variations of the constants of the vacuum tubes.

Essentially, the invention comprises a telemetering circuit wherein a change in frequency, instead of a change in intensity, is utilized to indicate a change in condition of apparatus. For indicating this change, there is employed, as an important feature of the invention, a glow tube relaxation oscillator in which the frequency of the oscillations is controlled by the local voltage which is to be measured. The relaxation oscillations are of comparatively low frequency and modulate or interrupt the tone which is sent out over the transmission medium to the remote control station where the tone is amplified and rectified for operating an indicating device. Since the registration of the indicating device is dependent only on the frequency of the relaxation oscillator, which, in turn, is dependent upon the value of the voltage to be measured, any changes in the transmission characteristics of the transmission line or variations of the constants of the vacuum tubes anywhere in the system beyond the relaxation oscillator will not affect the accuracy of the remote reading. In the case where telemetering indications are sent over a radio circuit instead of a wire line, the present invention renders the meters substantially independent of fading variations since it is the modulation frequency rather than the intensity of the signal that determines the meter indications.

One application for the invention, which is mentioned merely by way of example, is to indicate at a master station the modulation level at any one or more of a plurality of relay stations.

In the drawings:

Fig. 1 illustrates diagrammatically, in simplified form, the principles underlying the present invention;

Figs. 2 and 3 illustrate the invention as applied to a complete telemetering system for a single remote station; and Fig. 4 shows diagrammatically the application of the invention to a plurality of stations multiply connected to a control station by a single transmission medium.

Referring to Fig. 1, there is shown a source of voltage E whose value varies in accordance with the change in condition of the apparatus at a station, and which it is desired to read at a remote point. As an illustration, the value of source E may indicate the modulation level of the station.

This voltage is shown connected to the grid of a vacuum tube I, the plate current for which is furnished by a battery 2 through a resistance $R_1$. In the output of tube I is a glow tube relaxation oscillator comprising a glow tube G having in shunt therewith a condenser $C_1$ which is arranged to be charged up through a high resistance $R_2$. When the charge on the condenser $C_1$ reaches a predetermined value, it causes the glow in tube G to strike whereupon the condenser discharges through the resistance $R_3$. As soon as the condenser has been discharged and the voltage stored up drops below the extinction point of the glow tube G, the condenser starts to charge again through $R_2$. The same cycle of operations will now repeat itself. The frequency of the discharge through glow tube G, however, is dependent not only upon the value of $R_2$ and $C_1$, but also upon the voltage which is applied across the resistance $R_2$ in series with condenser $C_1$. This voltage, in turn, is dependent upon the plate current of tube I flowing through resistance $R_1$. The value of the plate current is determined by the value of the voltage E which is to be measured. From this it will be evident that when the grid of tube I is biased to cut-off, or nearly so, the plate current flowing through $R_1$ will be small, so that the voltage applied to $R_2$ is practically equal to that of the battery 2. For this condition, the glow tube discharges rapidly, producing a frequency of say 20 cycles. On the other hand, if the grid of tube 1 is less negative, as when considerable current flows through the plate circuit of the tube, there will be an IR drop across resistance $R_1$ to the relaxation oscillator. For this condition, the frequency of the oscillations will be much lower, say 1 cycle per second. For intermediate values of grid potential, the frequency generated by the relaxation oscillator will assume some intermediate value between 1 cycle and 20 cycles. From this it will be seen that the frequency generated by the relaxation oscillator is a direct function of the voltage E which is to be measured.

Connected to the lower electrode of glow tube G is a resistance $R_3$ through which the discharges occur. The upper terminal of this resistance is connected through a battery 3 to the grid of a vacuum tube 4. Battery 3 is adjusted to such a value that the plate current of tube 4 is zero when there is no current flowing through $R_3$. However, when the glow tube discharges through $R_3$ the top of the resistance becomes positive, thereby swinging the grid of tube 4 to such a value that plate current passes in tube 4 from battery 6 through relay 5. The passage of current through relay 5 will cause it to be energized enabling its armature 8 to engage with contact 7, thus charging the condenser $C_2$ from the battery 10. As soon as condenser $C_1$ has discharged through the glow tube G, the plate current of tube 4 will again drop to zero and relay tongue 8 will make contact with 9 thus discharging condenser $C_2$ through the meter 11. Meter 11 is arranged to be highly damped such that its pointer indicates the average value of the current flowing through the meter and does not respond to the individual discharges from condenser $C_2$.

When the frequency of the relaxation oscillator is high, condenser $C_2$ is charged and discharged rapidly through meter 11, causing the meter to indicate a high value. On the other hand, when the relaxation oscillator frequency is low, the condenser $C_2$ is discharged at a lesser number of times per second and meter 11 indicates a low value. The reading of meter 11 will be directly proportional to the frequency of the relaxation oscillator. Consequently, it will be seen that the meter 11 will indicate a reading which is directly proportional to the negative voltage E applied to the grid of tube 1. The voltage E may be a D. C. voltage obtained directly from a D. C. source which is to be measured, or it may be rectified current obtained by rectifying a radio frequency or other alternating current voltage.

In Fig. 2 a telemetering arrangement is illustrated which may be used over a line L. Like reference characters are here employed to designate like parts throughout the drawings. In this figure a source of alternating current voltage E is applied to tube 1 through a transformer having a primary 14 and secondary 12. Tube 1 is biased to cut-off by battery 13, such that tube 1, in effect, acts as an asymmetrical grid rectifier.

The operation of the relaxation oscillator is identical with that described above in connection with Fig. 1. Instead of a single tube 4, there are shown two tubes 18 and 19 with the plates connected in push-pull relation through a primary coil 21 of a transformer. The grids of the two tubes are also connected in push-pull relation to the secondary 17 of another transformer which is coupled to the primary 16. This primary coil is energized by audio frequency oscillator 15. When no current flows through the resistance $R_3$, battery 3 biases the grids of 18 and 19 to cut-off and the audio frequency oscillations from oscillator 15 will not be sent out over the line L. When the glow tube G breaks down, however, current passes momentarily through resistance $R_3$ and the IR drop in $R_3$ overcomes the negative bias provided by battery 3 and the grids of tubes 18 and 19 are momentarily such that these tubes act as an ordinary push-pull amplifier amplifying the audio frequency waves from oscillator 15 and passing the same to the line L through transformer 21—22 and a filter 23. Filter 23, as well as filter 24 at the opposite end of the line, are each designed to be a band-pass filter which is adjusted to pass the frequency of oscillator 15.

At the far end of the line, the current from filter 24 is applied through transformer 25—26 to the grid of tube 28. The amplified current is passed through transformer 29—30 to full-wave rectifier 31. It will thus be noted that on the line L there exists a frequency corresponding to the frequency of oscillator 15 which frequency is chopped or modulated by the frequency of the relaxation oscillator consisting of $R_2$, $C_1$, G and $R_3$. After amplification by amplifier 28 and rectification by rectifier 31, there will again be obtained pulses corresponding with the modulation frequency or the frequency of the relaxation oscillator. These direct current pulses are passed through a low pass filter 32 which passes the pulse or modulation frequency but cuts off harmonics of the carrier frequency determined by oscillator 15. The rectified current passes through potentiometer 33 to ground. Tube 35 is connected to the potentiometer through a battery 34 which is adjusted such that tube 35 has a definite plate current when no rectified current from rectifier 31 is flowing to ground through potentiometer 33. The plate current of tube 35 through battery 36 causes an IR drop in resistance 37 such that the IR drop added to the battery 38 cuts the plate current in tube 4 to zero when no rectified current is flowing through potentiometer 33. When a pulse of rectified current passes through potentiometer 33, it causes the grid of tube 35 to go negative to such an extent that the plate current of tube 35 is cut to zero, consequently there is no IR drop through resistance 37, and the grid of tube 4 is biased only by the amount of potential produced by the battery 38. This allows a definite value of plate current to flow through the relay 5 and pulls the tongue 8 against contact 7 and charges condenser $C_2$ from battery 10 as was described in disclosing Fig. 1.

When the plate current of tube 4 is cut off, the tongue 8 drops back against contact 9 and discharges condenser $C_2$ through meter 11. The tubes 35 and 4 constitute a limiter arrangement similar to that used on the well known diversity receiver circuit.

If the modulated tone received over the line after being rectified, is of sufficient intensity to bias the tube 35 to cut-off, the system will operate as described. If the intensity of the tone exceeds this value, it will simply drive the grid of tube 35 still further below the cut-off point and the device still continues to operate. In this way there is eliminated any difficulty in the operation of the device due to variations of the carrier frequency current anywhere along the system.

In the arrangement described in Fig. 2, the reading of the meter 11 will be inversely proportional to the voltage applied to the grid of tube 1 instead of directly proportional thereto as described in connection with Fig. 1. This will be apparent from a consideration of the rectifying properties of tube 1 which is biased to cut-off. It will thus be seen that the stronger the A. C. voltage applied to the grid of tube 1, the greater will be the plate current and the lower will be the frequency generated by the relaxation oscillator. This in turn decreases the reading of the meter 11 at the distant end. That is, for this arrangement the reading at the distant end is inversely proportional to the input voltage at the other end of the line. Such an arrangement is satisfactory in cases where it is mainly desirable to have volume indicators at a common control point which will indicate the level of any desired quantity at a multiplicity of remote points. In such a case the indications would merely be used for setting up the levels throughout the system and maintaining them there.

In many cases it may be desirable to have the indications at the metering point directly proportional to the voltage or current which is to be measured at the other end of the line. Fig. 3 shows a modification which will accomplish this result, and in the system of this figure a rectifier 71 is added ahead of vacuum tube 1. The negative side of rectifier 71 is connected to the grid of tube 1 and a suitable bias potential is applied to the grid by battery 73 through a resistance 72. With the arrangement described, an increase in voltage in the primary of transformer 14 will cause an increase in rectified current through the tube 71 which in turn makes the grid of tube 1 go more negative. The plate current of tube 1 decreases so that the I. R. drop through resistance $R_1$ is less and the voltage to $R_2$—$C_1$ is increased and the frequency of the relaxation oscillator is increased. From what has gone before, it will be obvious that this will cause an increase in the reading of meter 11 at the other end of the line. Thus, there are obtained remote indications which are proportional to the voltage or current to be measured providing the rectifier at the input end is made substantially linear.

In Fig. 3 there is also shown the circuit which would be used if the relay at the distant end of the line is eliminated and the meter 11 is placed directly in the plate circuit of the tube 4. As already stated, the limiter tube 35 will practically eliminate the effects of line variations so that the indications in the plate circuit of tube 4 should be substantially independent of the same line variations. While there are shown full-wave rectifiers 71 and 31, it is obvious that these can be replaced by bias rectifiers or by dry rectifiers, such as cuprous oxide or any other convenient type. It is also possible to simplify the modulating arrangement which takes place in tubes 18 and 19. For example, a single tube could be used rather than the push-pull arrangement which was disclosed. Other obvious simplifications can be made to suit the particular condition for which this telemetering arrangement is to be used.

Fig. 4 is merely an extension of Fig. 2, showing how three telemeter devices can be associated with a single line 56. The following is given merely to indicate how voltage E at the distant point is utilized to produce a reading at the control point. The source of voltage is indicated by the circuit 50 which is connected through a transformer 51—52 corresponding with transformer 14—12 of Fig. 2. The glow tube chopper circuit is indicated as 54 and the bandpass filter 55 corresponds with filter 23 of Fig. 2. In other words, the elements 50 to 55 of Fig. 4 correspond exactly with the elements 14 to 23 in the upper half of Fig. 2. The line 56 of Fig. 4 corresponds with the line L of Fig. 2. The filter 66 corresponds with filter 24 of Fig. 2 and the amplifier 65, rectifier 64 and limiter-relay 63 correspond with elements 28, 31, and 35—4 of the lower part of Fig. 2. The meter 62 corresponds with meter 11 of Fig. 2. The operation of Fig. 4 will be obvious from this description. The oscillators are adjusted for definite frequencies $F_1$, $F_2$ and $F_3$ which pass through band-pass filters which allow the separate indications to be separated at the remote point. These filters may be voice frequency carrier filters based on the odd harmonic of 85 cycles such that they will pass frequencies of 425 cycles, 595 cycles, 765 cycles, 935 cycles, 1105 cycles, etc. This system is well known to the art and will not be described herein.

Although the principles of the present invention are herein described with special reference to a radio relaying system, it is to be understood that the invention is not limited thereto since it is equally applicable to other circuit arrangements without departing from the spirit and scope of the invention.

What is claimed is:

1. In a telemetering system, the method of measuring a multiplicity of sources of electrical energy between two remote stations connected together by a transmission medium which comprises producing a multiplicity of oscillations characteristic of the separate energies to be measured at one station, modulating separate carrier frequencies with said characteristic oscillations, transmitting said modulated carrier frequencies over the medium to the other station, demodulating the separate carrier frequencies to obtain the characteristic oscillations, limiting the amplitude of the demodulated oscillations and separately indicating visually the frequency change of each of the characteristic oscillations.

2. A telemetering system comprising a plurality of stations situated at intervals, a first source of oscillations at each of said stations whose frequency varies in dependence upon a source of energy at that station to be measured, a second source of oscillations at each of said stations adapted to be modulated by said first source located at the same station, each of said second sources of oscillations generating oscillations of a frequency which is characteristic of its associated station, the characteristic frequencies of said stations being different, a transmission medium multiply associated with said stations, a central station associated with said transmission medium, amplitude limiting means at said central station for each characteristic frequency, and indicating instruments at said central station individual to said plurality of stations for indicating the different characteristic frequencies of said stations.

3. A method of telemetering which comprises generating oscillations whose frequency varies in accordance with a voltage source to be measured, generating oscillations of a substantially constant but higher frequency, interrupting the flow of said oscillations of higher frequency at the frequency of said first oscillations, transmitting the interrupted frequency energy over a suitable transmission medium and subsequently receiving said interrupted, substantially constant frequency oscillations, rectifying said received oscillations, limiting the amplitude of the rectified oscillations, and measuring the rate of interruption of said substantially constant frequency.

4. A method of telemetering which comprises generating oscillations whose frequency varies in accordance with a voltage source to be measured, generating oscillations of a substantially constant but higher frequency, interrupting the flow of said oscillations of higher frequency at the frequency of said first oscillations, transmitting the interrupted frequency energy over a suitable electrically conductive transmission medium and subsequently receiving said interrupted substantially constant frequency oscillations, rectifying said received oscillations, limiting the amplitude of the rectified oscillations, and measuring the rate of interruption of said substantially constant frequency.

HAROLD H. BEVERAGE.